United States Patent [19]

Union

[11] Patent Number: 4,550,904
[45] Date of Patent: Nov. 5, 1985

[54] PAPER SUPPORT BAR WITH ROTATION RESISTANT SUPPORT FINGERS

[75] Inventor: Elias J. Union, Blair, Nebr.

[73] Assignee: J. C. & D Enterprises, Inc., Omaha, Nebr.

[21] Appl. No.: 604,360

[22] Filed: Apr. 27, 1984

[51] Int. Cl.$^4$ .................. B65G 29/00; B41F 21/08
[52] U.S. Cl. .................................. 271/198; 271/204; 101/420
[58] Field of Search .......... 101/416 R, 416 A, 416 B, 101/417, 419, 420; 34/6, 7, 16, 24, 94; 271/190, 198, 204, 205, 206

[56] References Cited

U.S. PATENT DOCUMENTS

| | | | |
|---|---|---|---|
| 1,833,133 | 11/1931 | Stoessel | 101/416 A |
| 2,025,481 | 12/1935 | Stüssi | 271/204 |
| 3,807,287 | 4/1974 | Plagata | 271/206 |
| 4,276,978 | 7/1981 | Deguchi | 271/204 |
| 4,369,963 | 1/1983 | Jamieson | 271/204 |

Primary Examiner—Clyde I. Coughenour
Assistant Examiner—William L. Klima
Attorney, Agent, or Firm—Henderson & Sturm

[57] ABSTRACT

An improved paper support bar for use in a chain driven printing press having a bar (11) that may be permanently attached to the drive chains (17) of a printing press and a plurality of paper supporting fingers (13) snugly disposed thereon for supporting paper (32). Each finger (13) has a hole (27) disposed therethrough that conforms in configuration to the cross section of the bar (11). Each finger (13) also has a plurality of ridges (28) formed thereon to contact the bar (11) and further aid in snugly holding the finger (13) on the bar (11). Each finger (13) also includes an inclined edge (29) formed thereon to present only a very narrow edge (31) to the paper (32) as a support surface.

1 Claim, 3 Drawing Figures

PAPER SUPPORT BAR WITH ROTATION RESISTANT SUPPORT FINGERS

TECHNICAL FIELD

This invention relates generally to paper support apparatus and more particularly to such apparatus as used in printing presses.

BACKGROUND ART

Printing presses typically operate to place liquid ink upon a desired surface, such as paper, in a desired configuration. Generally ink so applied will not dry instantly. Therefore, a freshly inked surface should not be allowed to contact any other surface that might disturb the intended configuration until the ink has dried. At the same time, for purposes of efficiency, the operator will generally move the freshly inked paper away from the printing area as soon as possible in order to allow an uninked paper to be substituted in its place.

This, then, forces a compromise. Freshly inked paper must be moved with potentially wet ink disposed thereon without unduly disturbing the integrity of the printing effort itself.

In the type of printing press characterized by at least two parallel disposed drive chains that constantly move during the printing operation to facilitate various functions (hereinafter collectively referred to as "chain driven printing presses"), one or more rotatable wheels are generally located between the drive chains to support freshly inked paper while moving the paper from the printing area. This does not always operate in a satisfactory manner. For instance, these wheels are not necessarily easily movable in an axial direction, with the result that the wheels may themselves directly contact a freshly inked area. Furthermore, the wheels are typically so wide as to enhance the risk that a freshly inked area will be contacted. Finally, such wheels often do a poor job of supporting paper. In short, such wheels only poorly meet the intended compromise of supporting the paper during movement while not disturbing fresh ink.

In an attempt to resolve these problems as arise with chain driven printing presses, a paper support bar has been proposed. This bar comprises an elongated member that may be connected at either end to both drive chains through use of spring like clamp mechanisms which essentially serve to non-permanently attach the bar to the chains. A plurality of movable fingers are disposed on the bar to support the paper in a number of places.

This apparatus comprises an improvement over the wheel mechanism mentioned above, but many problems have been newly introduced by its use. For instance, this bar is easily dislodged from attachment to the chain. This risks not only one or more pieces of printed paper, but may risk damage to the printing press itself. In addition, the bar has a square or rectangular cross section, whereas the fingers have a round hole disposed therethrough for fitting about the bar. So configured, the fingers are relatively easily dislodged from desired settings, thereby risking movement of a finger to an ink disturbing position and/or to a position that provides little or not appropriate support for the paper itself. In addition, these fingers are so configured as to still provide far too much contact with the paper itself, thereby increasing the risk that a freshly inked area will be disturbed.

DISCLOSURE OF THE INVENTION

These and other problems are substantially resolved by provision of the improved paper support bar disclosed herein. This bar includes an elongated member having a first end and a second end, first and second connecting links for allowing the bar to be affixed to the drive chains of the printing press, and a plurality of paper support fingers.

The bar itself has a substantially square cross section and further has a slot formed in each end for receiving the connecting link structure. The bar should be comprised of substantially rigid material, such as aluminum or steel, such that the bar will not become bent and thereafter provide a poor base for supporting paper.

The connecting links have a first flange for disposition within the slot provided therefor in the end sections of the bar. Each connecting link further includes two link mounting rods disposed parallel to one another. These mounting rods may then be disposed through holes appropriately provided therefor on the drive chains of the printing press and locked in place through use of a lock clip, thereby permanently attaching the bar to the chain.

Each finger comprises a plastic member having a substantially square shaped hole formed therethrough as defined by four planar surfaces. The dimensions of the square hole are substantially similar to the dimensions of the cross section of the bar such that the fingers are snugly receivable thereabout, yet can be moved as desired with respect to the bar.

In addition, a ridge has been formed on the surface of each planar surface to provide additional gripping action with respect to the bar to prevent unintended movement of the fingers with respect to the bar. Finally, each finger includes an inclined edge that forms a paper contacting surface along only a very narrow edge, thereby minimizing the risk that an inked area will be contacted by any given finger.

This improved paper support bar can be retrofit into an existing chain driven printing press, despite the fact that such installment, once made, is permanent. The bar can also be factory installed. Once installed, the bar cannot be easily dislodged. The fingers can be easily adjusted to positions that will maximize paper support functions and minimize ink disturbing potential. Once so located, the fingers will stay where placed and are not easily subject to dislodgement.

BRIEF DESCRIPTION OF THE DRAWINGS

These and other attributes of the invention will become more clear upon a thorough review and study of the following description of the best mode for carrying out the invention, particularly when reviewed in conjunction with the drawings, wherein.

BEST MODE FOR CARRYING OUT THE INVENTION

Figure 1:
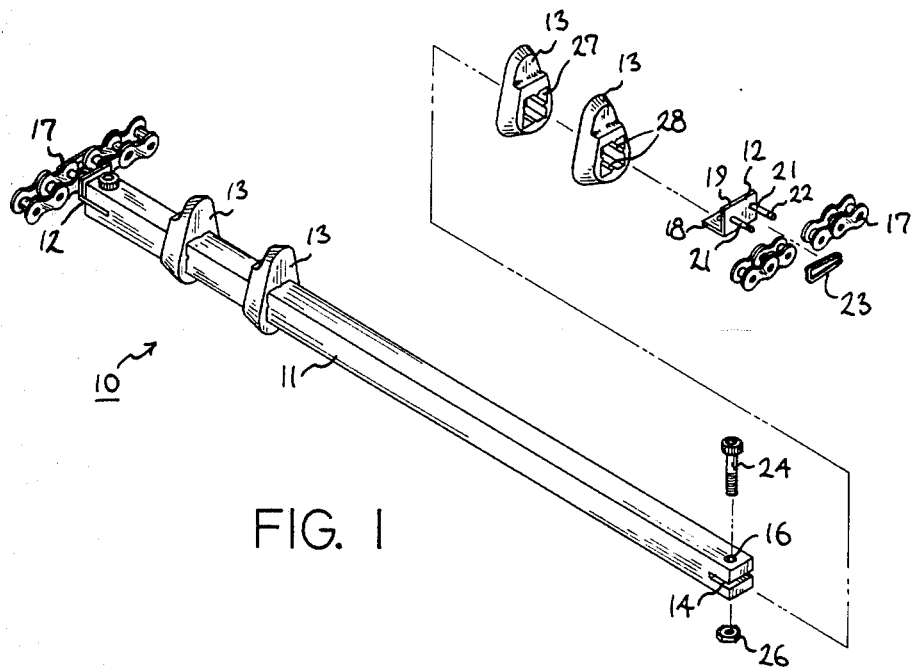
FIG. 1 comprises a perspective assembly view of the apparatus as attached to a drive chain.

Referring now to the drawings, and in particular to FIG. 1, the apparatus of the invention can be seen as depicted generally by the numeral 10. The apparatus (10) includes generally a paper support bar (11), two connecting links (12) and a plurality of paper support fingers (13). Each of these components will now be dscribed in more detail in seriatim fashion.

With continued reference to FIG. 1, the paper support bar (11) may be comprised of an aluminum shaft having a substantially square cross section. Each end of the bar (11) has a slot (14) disposed therein and a hole (16) disposed therethrough at an angle substantially normal to the disposition of the slot. The length of the bar (11) is such that it will fit substantially and entirely between two drive chains (17) as found on a chain driven printing press.

The connecting links (12) are identical to one another, and hence only one will be described here in detail. The connecting link (12) has a first flange (18) that may be fit within the slot (14) provided therefor in the paper support bar (11). A second flange (19) connects normally to the first flange (18) and serves to support two parallel disposed link mounting rods (21). As shown in FIG. 1, these link mounting rods (21) may be disposed through holes in the drive chain (17) itself as result when the chain (17) has one link removed therefrom.

Figure 3:
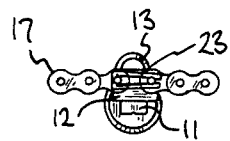
FIG. 3 comprises a side elevational view of the apparatus as connected to a drive chain.

Each link mounting rod (21) further has a groove (22) formed peripherally thereabout proximal the end portions thereof so that a lock clip (23) may be disposed therein (as best shown in FIG. 3) in order to lock the connecting link (12) to the drive chain. The first flange (18) of the connecting link (12) also has a hole disposed therethrough. This hole may be aligned with the hole (16) provided in the paper support bar (11) and a screw (24) or other member may be disposed therethrough and a nut (26) (such as an aircraft hexnut) may be threadably engaged therewith in order to lock the connecting link (12) to the paper support bar (11).

The fingers (13) are identical to one another and hence only one will be described in detail. With continued reference to FIG. 1, each finger (13) may be comprised of polypropylene plastic having square shaped hole (27) formed therethrough as defined by four planar surfaces. In addition, a ridge (28) may be axially formed on each planar surface such that each square shaped hole (27) includes four such ridges (28). The dimensions of the hole (27) relate closely to the dimensions of the cross section of the paper support bar (11) such that the fingers (13) may be snugly, though movably, disposed about the bar (11).

Figure 2:
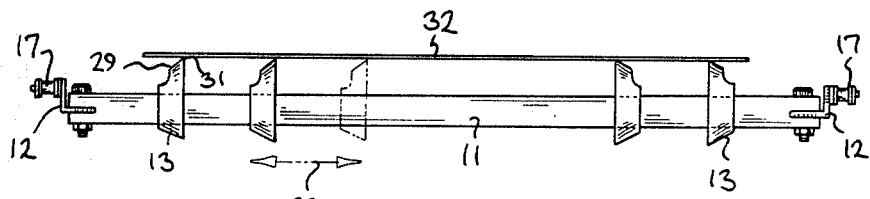
FIG. 2 comprises a front elevational view of the apparatus when supporting a piece of paper.

As shown in FIG. 2, each finger (13) has a distal end that comprises an inclined edge (29). The determinating narrow edge (31) of this inclined edge (29) forms a paper contacting surface. As shown in FIG. 2, a piece of paper (32) can be supported by these fingers (13) while maintaining a minimum of contact between the fingers (13) and the paper (32). Furthermore, although the finger (13) will remain where placed, each finger can also be easily moved to a new position (as depicted by the arrow denoted by the numeral 33) in order to provide appropriate paper support and/or to avoid an inked area.

By installation of these improved paper support bars in a chain driven printing press, the operator can be assured that the bar will not become easily dislodged from the chain. The operator can be further assured that paper will be adequately supported during movement from the printing area and that the potential risk of contacting a freshly inked area is minimized.

Obviously, numerous modifications and variations of the present invention are possible in light of the above teachings. It is therefore to be understood that the invention may be practiced otherwise than as specifically described therein.

I claim:

1. In a paper support bar for use in a chain driven printing press having at least two substantially parallel disposed drive chains, the paper support bar including an elongated generally rectangular bar having a first end and a second end and a plurality of paper support fingers movably disposed on said bar, an improvement comprising:

a first connecting link affixed to said first end of said bar for attaching said first end to one of said drive chains;

a second connecting link affixed to said second end of said bar for attaching said second end to another of said drive chains; and an inclined edge formed on the reduced distal end of each of the said plurality of paper support fingers such that only a narrow edge serves as a paper contacting surface, wherein each of said fingers is further provided with a generally square shaped hole formed therethrough as defined by four substantially planar surfaces, which closely conforms to the cross-sectional dimensions of the elongated bar to allow axial translation of the said fingers along the said bar, while preventing relative rotation of the said fingers on said bar, wherein said four substantially planar surfaces are each provided with one raised ridge parallel to said support bar and located at the center of each planar surface formed thereon to contact said bar and aid in snugly retaining said fingers on said bar.

* * * * *